United States Patent [19]

Sasamura et al.

[11] Patent Number: 4,861,099

[45] Date of Patent: Aug. 29, 1989

[54] DOOR ALIGNMENT ASSEMBLY AND METHOD

[75] Inventors: Ross S. Sasamura; John H. Jewell, II, both of Fremont, Calif.

[73] Assignee: Paccar Inc., Bellevue, Wash.

[21] Appl. No.: 167,308

[22] Filed: Mar. 11, 1988

[51] Int. Cl.⁴ ................................................ B60J 1/00

[52] U.S. Cl. ...................................... 296/202; 49/396; 292/302; 29/434

[58] Field of Search .................. 296/146, 202; 49/396; 292/302, 341.12, DIG. 39, DIG. 40; 29/434

[56] References Cited

U.S. PATENT DOCUMENTS 1,991,517 2/1935 Perry .................................. 296/202

2,187,530 1/1940 Butler ......................... 292/DIG. 40

*Primary Examiner*—Joseph F. Peters, Jr.

*Assistant Examiner*—Jesûs D. Sotelo

*Attorney, Agent, or Firm*—Flehr, Hohbach, Test, Albritton & Herbert

[57] ABSTRACT

An alignment assembly for aligning a door in a door jamb as the door is rotated into a closed position is disclosed. The door alignment assembly includes at least two door alignment components mounted in proximity to one another generally opposite the pivot axis of the door, one alignment component mounted on the door and the other alignment component mounted on the door jamb. The door alignment components include an alignment wedge having an arcuate surface and an alignment assistor having an angled lateral edge positioned to contact the arcuate surface of the alignment wedge along a substantially point contact to align the door in a top/bottom orientation in the door jamb. The alignment wedge also includes a tapered interface surface extending in a plane substantially perpendicular to the arcuate surface, the interface surface being positioned to contact an opposing surface of the door or door jamb when the door is in the closed position to align the door in a fore/aft orientation with respect to the door jamb. An improved method for simultaneously aligning the door and the door jamb in top/bottom and fore/aft orientations is also provided.

21 Claims, 3 Drawing Sheets

DOOR ALIGNMENT ASSEMBLY AND METHOD

TECHNICAL FIELD

The present invention relates generally to a door alignment assembly and method for providing accurate and reliable alignment of a door in a door jamb, and for providing proper alignment of door latching components when the door is in the closed position. The door alignment assembly and method of the present invention is particularly suitable for use in motor vehicle door assemblies.

BACKGROUND ART

To reduce exterior noise inside a motor vehicle passenger area or a truck cab area, and to protect the interior of the motor vehicle passenger area from the elements, the doors must be properly aligned and sealed in the door openings. A door latching component is conventionally mounted on the door jamb for engagement with a latching mechanism mounted on the door, and the door latching component is generally provided with a rubber enclosed steel sleeve at its latch contact area to accommodate and compensate for misalignment of the door latching components and the latching mechanism as the door is closed. For safety purposes, these door latching components must be aligned so that they engage properly to latch the door in the closed position.

According to conventional truck cab assembly practices, wedges are fastened to the top and bottom of the cab door to center the door in the door jamb in a top and bottom direction, and to prevent interference between the top and bottom edges of the door with the corresponding portions of the door jamb. Alignment assemblies such as a mating pocket and cup mounted on corresponding portions of the door and door jamb, and protruding rods which contact alignment means are also known to the art. These arrangements do not, however, provide proper alignment of the door and the door latching components in the fore and aft direction.

Accordingly, it is an objective of the present invention to provide a door alignment assembly and method for proper alignment of a door in a door jamb in both the top/bottom and fore/aft directions.

It is another objective of the present invention to provide improved door latching safety and reliability by accurately aligning door latching components mounted on the door jamb with the door latching mechanisms mounted on the door.

It is yet another objective of the present invention to simultaneously provide positive alignment of the door in a door jamb in the top/bottom direction and in the fore/aft direction by means of an alignment assembly mounted in proximity to the latch assembly.

DISCLOSURE OF THE INVENTION

The door alignment assembly of the present invention is suitable for use with doors hinged in a door jamb and pivotable about a pivot axis. The door alignment assembly comprises at least two components, including an alignment wedge having at least one arcuate surface and a mating alignment assistor having at least one angled lateral edge mounted in proximity to one another and generally opposite to the pivot axis of the door. One alignment component is mounted to a peripheral surface of the door, while the other alignment component is mounted to a corresponding portion of the door jamb. The alignment components are mounted to provide a line of contact across the width of the arcuate surface of the alignment wedge with the angled lateral edge of the alignment assistor as the door is closed in the door jamb. Contact between the arcuate surface of the alignment wedge and the angled lateral edge of the alignment assistor provides alignment of the door with respect to the door jamb in what is referred to herein as the top and bottom direction.

According to a preferred embodiment of the present invention, two alignment wedges are mounted to a door in spaced apart relationship with their arcuate surfaces facing one another and an alignment assistor having two angled lateral edges is mounted to the door jamb. The alignment components are dimensioned and positioned to provide a line of contact across the width of the arcuate surface of each alignment wedge with the corresponding angled lateral edge of the alignment assistor as the door is closed in the door jamb to align the door with respect to the door jamb in the top and bottom orientation.

The door alignment assembly of the present invention additionally includes features providing proper alignment of the door in the door jamb in what is referred to herein as the fore and aft direction. According to a preferred embodiment of the present invention, each alignment wedge has at least one graded or angled surface which interfaces with an opposing surface of the door or door jamb to align the door in a fore and aft direction as the door is closed in the door jamb. Thus, the door alignment assembly of the present invention simultaneously provides alignment of a door in the top/bottom and fore/aft directions as the door is closed in the door jamb.

The door alignment assembly of the present invention may be provided in conjunction with a latching mechanism mounted at a peripheral portion of the door of a motor vehicle or the like, generally opposite to the pivot axis of the door. A striker pin or the like, and a suitable striker pin guard are conventionally mounted on the door jamb in proximity to the door latch area for engagement with the latching mechanism when the door is in the closed position. According to a preferred embodiment of the alignment assembly of the present invention, the striker pin guard has angled lateral edges and serves as the alignment assistor for the door alignment assembly. At least one alignment wedge is mounted in proximity to the door latch area, and is preferably mounted to a peripheral surface of the door and/or the latch plate. The arcuate surface of the alignment wedge contacts an angled lateral edge of the striker pin guard mounted on the door jamb to align the door in the top and bottom direction as the door is closed and latched in the door jamb. A graded or angled surface of the door alignment wedge simultaneously interfaces with a surface of the door jamb in proximity to the door latch area to align the door in the fore and aft direction as the door is closed and latched in the door jamb. The striker pin guard preferably has two angled lateral edges, and two alignment wedges are preferably mounted to the door in spaced apart relationship with their arcuate surfaces facing one another and their graded or angled surfaces facing the door jamb to simultaneously align the door in the door jamb in the top/bottom and fore/aft directions as the door is closed and latched in the door jamb.

It will be recognized that the use of directions such as up/down and fore/aft merely describes relative orientations and is not intended to limit the present invention in any way. The alignment assembly is described herein in the context of a door having a generally vertical pivot axis. If the pivot axis of the door were oriented horizontally, for example, the alignment assembly would be mounted generally opposite the pivot axis and alignment would take place in the corresponding relative directions.

BRIEF DESCRIPTION OF THE DRAWINGS

Further features of the invention will be apparent from the following more detailed description read in conjunction with the drawings, in which.

BEST MODE OF CARRYING OUT THE INVENTION

The improved door alignment apparatus and method of the present invention is illustrated with reference to doors for use with motor vehicles such as automobiles, vans, truck cabs, and the like. It will be readily apparent to one skilled in the art that while the present invention is particularly suitable for use in a motor vehicle door environment, it is not limited to this application. The door alignment apparatus and method of the present invention may be adapted for use in other applications where a door, window, panel or the like is pivotally mounted in a frame and it is desirable for the door to be simultaneously aligned in the frame in top to bottom and side to side orientations.

Figure 1:
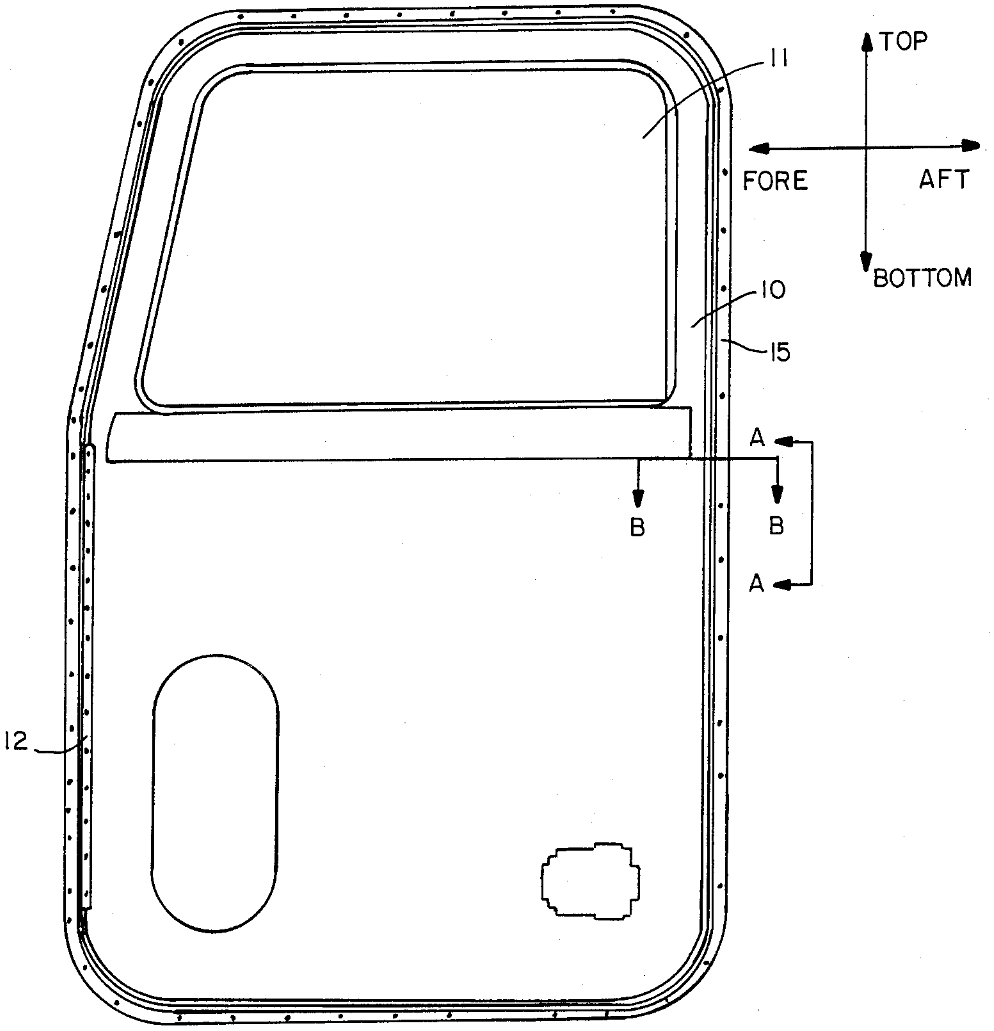
FIG. 1 shows a front view of a motor vehicle door aligned in a door jamb as viewed from outside the motor vehicle.

Turning now to the drawings, wherein like components are designated by like reference numerals throughout the various Figures, attention is first directed to FIG. 1 showing a door of the type mounted in truck cabs, generally indicated by reference numeral 10, having window opening 11 and hinge means 12 for mounting door 10 in door jamb 15. Door 10 pivots around the axis of hinge means 12 in door jamb 15 to open and close the door with respect to the door jamb. The directions indicated with reference to FIGS. 1–3 indicate the top (ceiling) and bottom (floor) orientations, as well as the fore (front axle) and aft (rear axle) orientations and the interior and exterior orientations with respect to the truck cab.

Figure 2:
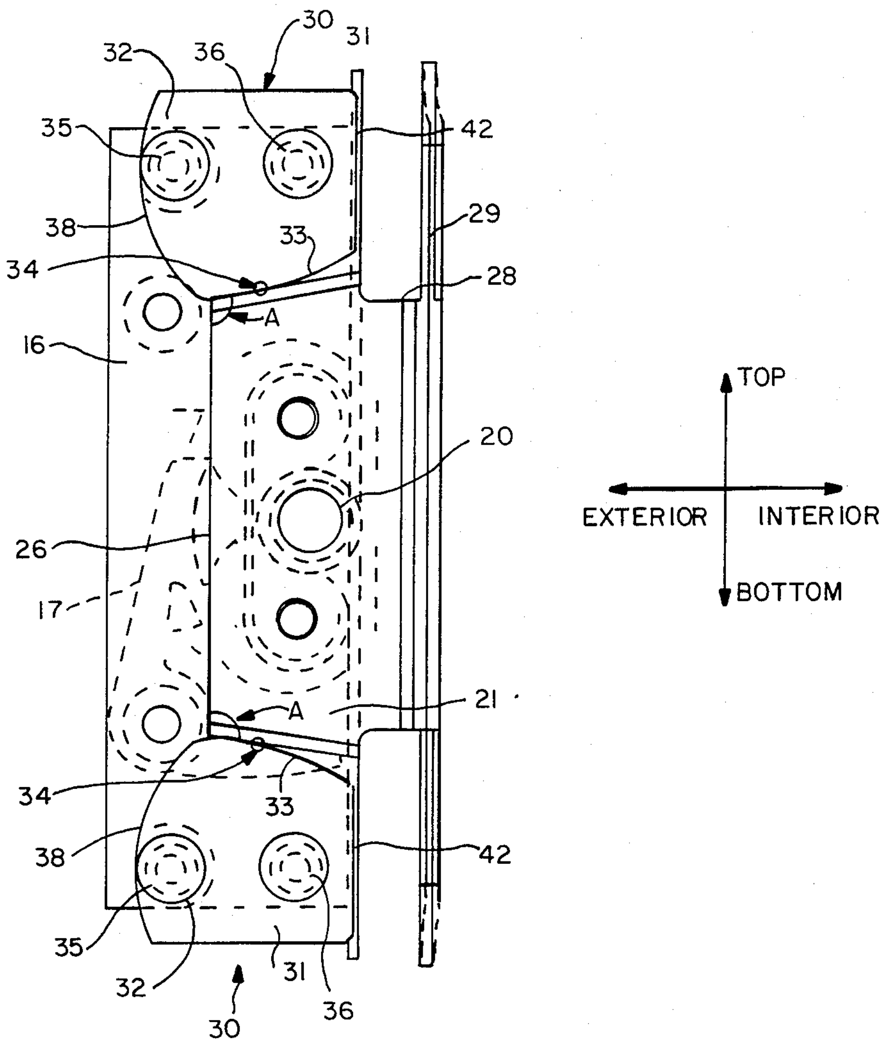
FIG. 2 shows an end view taken substantially along line A—A of FIG. 1 illustrating the alignment assembly of the present invention.
Figure 3:
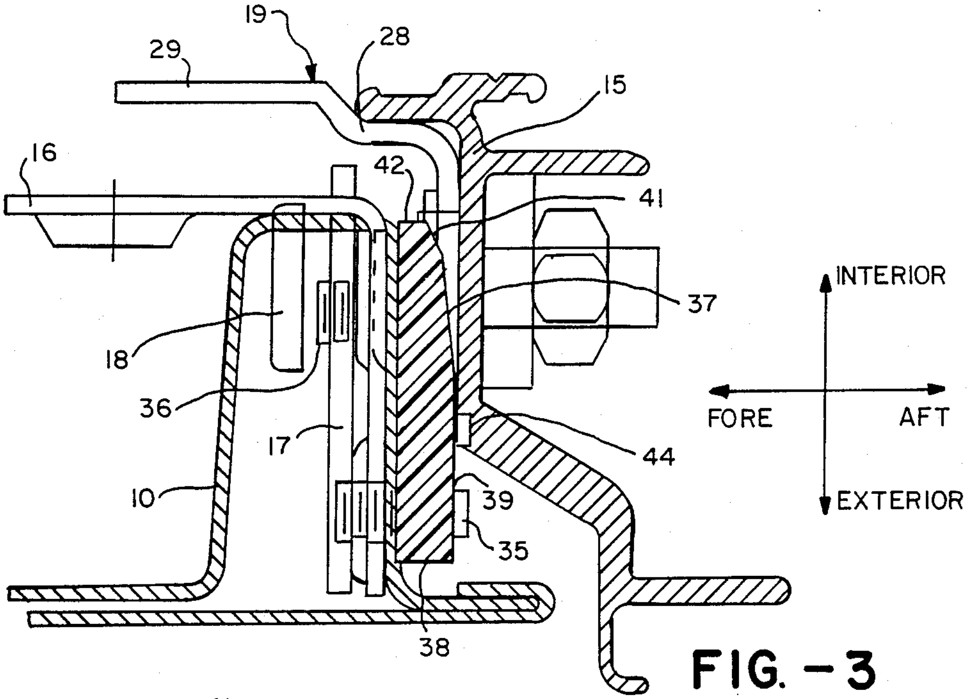
FIG. 3 shows a partially sectional view taken substantially along line B—B of FIG. 1 illustrating the alignment assembly of the present invention.

Referring more specifically to the end and partially sectional views of the door latch area of the door and door jamb shown in FIGS. 2 and 3, respectively, latch plate 16 is rigidly mounted on door 10, generally opposite the pivot axis of the door, and latching mechanism 17 is mounted to latch plate 16 inside the door structure. The preferred configuration and arrangement of the door jamb and latching components may vary for different applications and are not important for purposes of the present invention. Door latching components, including striker pin 18 and striker pin guard 19 are preferably mounted to door jamb 15 in proximity to the latching components mounted on door 10.

Figure 7:
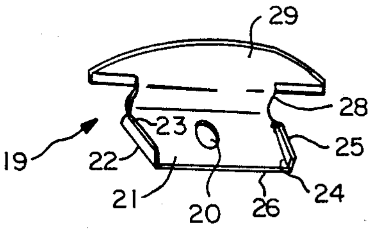
FIG. 7 shows a perspective view of a preferred embodiment of an alignment assistor according to the present invention.

According to a preferred embodiment of the alignment assembly of the present invention, striker pin guard 19, which is shown more clearly in the perspective view of FIG. 7, serves as the alignment assistor. First leg 21 of striker pin guard 19 is connected to second leg 29 by means of intermediate portion 28. First leg 21 and second leg 29 are preferably generally perpendicular to one another. First leg 21 is provided with bore 20 located generally centrally with respect to lateral edges 22 and 24 for passage of striker pin 18, and first leg 21 is mounted on an outer surface of door jamb 15. Lateral edges 22 and 24 of first leg 21 extend between front edge 26 and intermediate portion 28, and are provided with upstanding flanges 23 and 25, respectively, extending therefrom. Lateral edges 22 and 24 and the corresponding flanges extending therefrom are preferably oriented at an obtuse angle (A) with respect to front edge 26 of striker pin guard 19, as shown in FIG. 2. Angle (A) is preferably from about 95 to about 120 degrees, and is most preferably about 100 degrees. In the closed position of the door, as shown in FIG. 3, intermediate portion 28 of striker pin guard 19 abuts a flange of door jamb 15, and second leg 29 of striker pin guard 19 extends beyond door jamb 15 generally parallel to latch plate 16.

Figure 4:
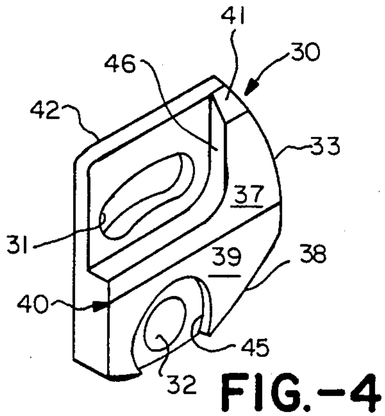
FIG. 4 shows a perspective view of a preferred embodiment of an alignment wedge according to the present invention.
Figure 5:
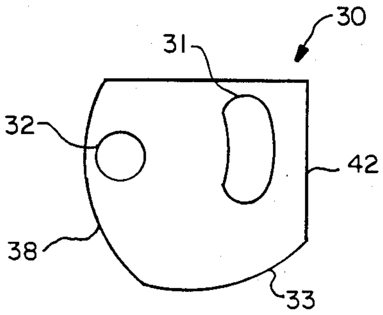
FIG. 5 shows a rear view of the alignment wedge of FIG. 4.
Figure 6:
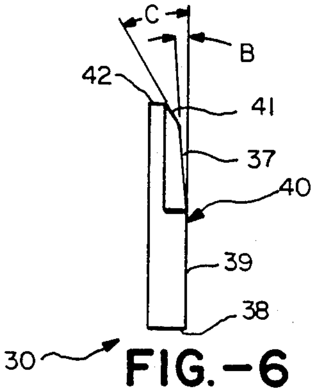
FIG. 6 shows a side view of the alignment wedge of FIG. 4.

FIG. 2 illustrates placement of alignment wedges 30 in the door latch area for aligning of the door in the door jamb in a top and bottom direction, and FIGS. 4–6 illustrate a preferred embodiment of alignment wedge 30 in detail. FIG. 2 illustrates the placement of alignment wedges 30 with respect to first leg 21 of striker pin guard 19. Door jamb 15 is not shown in FIG. 2 for purposes of clarity, but it is understood that in an assembled motor vehicle or the like, first leg 21 of striker pin guard 19 is mounted on the door jamb. Alignment wedges 30 are fastened to door 10 and latch plate 16 by fastening means 35 and 36, such as screws. According to a preferred embodiment, arcuate slots 31 are provided in alignment wedges 30 for passage of fastening means 36 to provide adjustment of alignment wedges 30 by sliding along arcuate slots 31, and bores 32 are provided for receiving fastening means 35 providing a stationary pivot point for limited rotation of alignment wedges 30 at arcuate slots 31. Each alignment wedge has at least one arcuate surface 33 extending between base edge 38 and leading edge 42. Alignment wedges 30 are mounted on the door with arcuate surfaces 33 facing one another and spaced apart from one another a distance corresponding approximately to the distance between lateral edges 22 and 24 of first leg 21 of striker pin guard 19.

As the door is pivoted into the closed and latched position in the door jamb, arcuate surfaces 33 of alignment wedges 30 have substantially a line of contact across the width of surfaces 33 as they engage corresponding angled flanges 23 and 25 of striker pin guard 19, indicated at points 34, to align the door in the top and bottom direction with respect to striker pin guard 19 and door jamb 15. It is an important feature of the door alignment assembly and method of the present invention to provide a line of contact between the alignment wedges and the alignment assistor to reduce frictional forces during alignment. Adjustment of alignment wedges 30 by rotation along arcuate slots 31 about stationary fastening means 35 permits proper positioning of arcuate surfaces 33 with respect to angled flanges 23 and 25 of striker pin guard 19 even when deviations have occurred in fabricating or mounting striker pin guard 19. Base edges 38 of alignment wedges 30 may also be curved to provide sufficient clearance during mounting and adjustment of the alignment wedges.

Although a preferred embodiment utilizing two alignment wedges 30 is illustrated, use of a single alignment wedge mounted in one of the positions shown in FIG. 2, and preferably the top position, may be sufficient or preferred for some applications. For example, many doors mounted along a vertical pivot axis tend to sag downwardly due to gravitational forces, and use of a single alignment wedge in the top position may be sufficient for proper alignment in the top and bottom direction. Use of two alignment wedges as shown in FIG. 2 is generally preferred, however, to provide more accurate alignment.

FIG. 3 illustrates placement of alignment wedges 30 in the door latch area for proper alignment of the door in the door jamb in a fore and aft direction, and FIGS. 4 and 6 illustrate a preferred embodiment of alignment wedge 30 in detail. As shown in FIG. 3, striker pin 18 penetrates the frame of door 10 when the door is in the closed position and engages in latching mechanism 17. As shown in the side view of FIG. 6, interface surface 40 of alignment wedge 30 is tapered from base edge 38 toward leading edge 42, and preferably includes angled surface 37 extending along at least a portion of its length at an acute angle (B) from a perpendicular to base edge 38. Acute angle (B) is preferably from about 1 to about 20 degrees, and is most preferably from about 3 to about 5 degrees. As illustrated in FIG. 4, interface surface 40 extends between base edge 38 and leading edge 42 along a plane generally perpendicular to the plane of arcuate surface 33.

Interface surface 40 may be angled along substantially its entire length, but it is preferably provided with a first portion 39 which extends substantially perpendicular to base edge 38, with angled surface 37 extending therefrom. Interface surface 40 may additionally be provided with angled relief surface 41 extending between angled surface 37 and leading edge 42 at an acute angle (C) from a perpendicular to base edge 38. Acute angle (C) is preferably from about 10 to about 80 degrees, and is most preferably from about 25 to about 40 degrees. Angled relief surface 41 is preferably provided as a leading surface to facilitate engagement of interface surface 40 with door jamb 15 under circumstances where the door is severely out of alignment. It is important that interface surface 40 tapers from base edge 38 toward leading edge 42, but the precise arrangement and dimension of perpendicular and/or angled surfaces forming interface surface 40 may be altered and adapted for use in various door and door jamb environments. As the door is moved to the closed position in the door jamb, interface surfaces 40 of alignment wedges 30 contact door jamb 15 at contact areas 44, as shown in FIG. 3. Contact areas 44 represent linear or rectangular surface areas providing alignment of the door in a fore-/aft orientation.

Suitable recesses and cavities are provided in alignment wedges 30 for passage of fastening means 35 and 36. According to a preferred embodiment illustrated in FIG. 4, enlarged recess 46 is preferably provided in alignment wedge 30 for receiving fastening means 36 flush or recessed with respect to interface surface 40. Enlarged recess 46 also accommodates adjustment of fastening means 36 along arcuate slot 31. Fastening means 35 may be partially or fully countersunk in alignment wedge 30 in recess 45, but need not be provided flush with interface surface 40 since alignment wedges 30 do not contact door jamb 15 in this area.

Alignment wedges 30 preferably comprise a high strength plastic material, and suitable materials are well known to the art. Ultra high molecular weight polyethylene is an especially preferred material for fabrication of alignment wedges 30. Polyethylene and other high strength plastic materials are known in which a lubricant is incorporated within the matrix of the plastic material, and use of these types of self-lubricating materials is preferred for fabrication of alignment wedges 30. The alignment assistor, described herein as striker pin guard 19, is preferably comprised of a rigid high strength metallic or plastic material.

The alignment assembly of the present invention has been described with reference to a preferred embodiment wherein an alignment wedge is mounted on the door and an alignment assistor is mounted on the door jamb. It will be understood that the positions of the alignment components may be reversed, and it is only important that one door alignment component is mounted to the door and the other door alignment component is mounted to the door frame, the alignment components being mounted in proximity to one another generally opposite the pivot axis of the door. Likewise, while a preferred embodiment of the alignment assembly has been described above with reference to latching mechanisms, it will be recognized that latching mechanisms need not be provided in connection with the door alignment assembly of the present invention.

While in the foregoing specification this invention has been described in relation to certain preferred embodiments thereof, and many details have been set forth for purposes of illustration, it will be apparent to those skilled in the art that the invention is susceptible to additional embodiments and that certain of the details described herein may be varied considerably without departing from the basic principles of the invention.

What is claimed is:

1. A door alignment assembly for aligning a door in a door jamb as the door is rotated into a closed position, the door being mounted for rotation between an open and a closed position about a pivot axis, said door alignment assembly comprising:

- first and second door alignment components mounted in proximity to one another generally opposite the pivot axis of the door, one alignment component mounted on the door and the other alignment component mounted on the door jamb;
- said first alignment component comprising at least one alignment wedge having an arcuate surface extending between a base edge and an opposite leading edge, and said second alignment component comprising an alignment assistor having at least one angled lateral edge;
- said alignment wedge and said alignment assistor positioned to provide a line of contact between said arcuate surface of said alignment wedge and said angled lateral edge of said alignment assistor when said door is moved into the closed position.

2. A door alignment assembly according to Claim 1 further comprises:

means for simultaneously aligning the door in a top/-bottom orientation and in a fore/aft orientation with respect to the door jamb.

3. A door alignment assembly for aligning a door in a door jamb as the door is rotated into a closed position, the door being mounted for rotation between an open and a closed position about a pivot axis, said door alignment assembly comprising:

first and second door alignment components mounted in proximity to one another generally opposite the pivot axis of the door, one alignment component mounted on the door and the other alignment component mounted on the door jamb;

said first alignment component including two alignment wedges each having an arcuate surface and said second alignment component including an alignment assistor having two angled lateral edges, said alignment wedges positioned with said arcuate surfaces facing one another and spaced apart from one another a distance corresponding approximately to the distance between said angled lateral edges of said alignment assistor to provide a line of contact between said arcuate surface of each of said alignment wedges and each of said angled lateral edges of said alignment assistor when said door is moved into the closed position.

4. A door alignment assembly according to claim 3, wherein each of said angled lateral edges of said alignment assistor extends at an obtuse angle from a front edge of said alignment assistor.

5. A door alignment assembly according to claim 4, wherein said obtuse angle is from about 95 to about 120 degrees.

6. A door alignment assembly according to claim 5, wherein said obtuse angle is about 100 degrees.

7. A door alignment assembly according to claim 4, wherein said alignment assistor is formed as a striker pin guard of a latching assembly, said striker pin guard comprises a first leg and a second leg generally perpendicular to one another and connected by an intermediate portion, and said two lateral edges extend between a front edge of said first leg and said intermediate portion at an obtuse angle.

8. A door alignment assembly according to claim 7, wherein said first leg of said striker pin guard has a bore located generally centrally with respect to said lateral edges, and said lateral edges have upstanding flanges extending therefrom.

9. A door alignment assembly for aligning a door in a door jamb as the door is rotated into a closed position, the door being mounted for rotation between an open and a closed position about a pivot axis, said door alignment assembly comprising:

first and second door alignment components mounted in proximity to one another generally opposite the pivot axis of the door, one alignment component mounted on the door and the other alignment component mounted on the door jamb;

said first alignment component comprising at least one alignment wedge having an arcuate surface extending between a base edge and an opposite leading edge, said alignment wedge additionally includes an arcuate slot for adjustably positioning said arcuate surface, and said second alignment component comprising an alignment assistor having at least one angled lateral edge; and said alignment wedge and said alignment assistor positioned to provide a line of contact between said arcuate surface of said alignment wedge and said angled lateral edge of said alignment assistor when said door is moved into the closed position.

10. A door alignment assembly for aligning a door in a door jamb as the door is rotated into a closed position, the door being mounted for rotation between an open and a closed position about a pivot axis, said door alignment assembly comprising:

first and second door alignment components mounted in proximity to one another generally opposite the pivot axis of the door one alignment component mounted on the door and the other alignment component mounted on the door jamb;

said first alignment component comprising at least one alignment wedge having an arcuate surface extending between a base edge and an opposite leading edge, and said second alignment component comprising an alignment assistor having at least one angled lateral edge, and said alignment wedge additionally including an interface surface extending between said base edge and said leading edge in a plane generally parallel to the plane of said arcuate surface, said interface surface tapering from said base edge toward said leading edge;

said alignment wedge and said alignment assistor positioned to provide a line of contact between said arcuate surface of said alignment wedge and said angled lateral edge of said alignment assistor when said door is moved into the closed position.

11. A door alignment assembly according to claim 10, wherein said interface surface has an angled surface extending at an acute angle with respect to a perpendicular to said base edge, and said acute angle is from about 1 to about 20 degrees.

12. A door alignment assembly according to claim 11, wherein said acute angle is from about 3 to about 5 degrees.

13. A door alignment assembly according to claim 11, wherein said interface surface additionally includes an angled relief surface extending from said angled surface toward said leading edge, and said angled relief surface extends at an angle of about 10 to about 80 degrees with respect to said perpendicular to said base edge.

14. A door alignment assembly according to claim 12, wherein said angled relief surface extends at an angle of about 25 to about 40 degrees with respect to said perpendicular to said base edge.

15. A door alignment assembly for aligning a door in a door jamb as the door is rotated into a closed position, the door being mounted for rotation between an open and a closed position about a pivot axis, said door alignment assembly comprising:

first and second door alignment components mounted in proximity to one another generally opposite the pivot axis of the door, one alignment component mounted on the door and the other alignment component mounted on the door jamb;

said first alignment component comprising at least one alignment wedge having an arcuate surface extending between a base edge and an opposite leading edge, said alignment wedge including a high strength plastic material having a lubricant material incorporated therein, and said second alignment component comprising an alignment assistor having at least one angled lateral edge;

said alignment wedge and said alignment assistor positioned to provide a line of contact between said arcuate surface of said alignment wedge and said angled lateral edge of said alignment assistor when said door is moved into the closed position.

16. A door alignment assembly for aligning a door in a door jamb as the door is rotated into a closed position, the door being mounted for rotation about a pivot axis between an open and a closed position, said door alignment assembly comprising an alignment wedge mounted generally opposite the pivot axis of the door, said alignment wedge having a base edge, an opposite leading edge, and an interface surface tapering from said base edge toward said leading edge, and said alignment wedge positioned to provide contact between said interface surface and the door jamb when the door is moved into the closed position to align the door in a fore/aft orientation with respect to the door jamb.

17. A door alignment wedge for aligning a door in a door jamb as the door is rotated into a closed position, the door alignment wedge including a base edge and an opposite leading edge, an arcuate surface extending between said base edge and said leading edge along a first plane, and an interface surface tapering from said base edge toward said leading edge along a second plane generally perpendicular to said first plane.

18. A door alignment wedge according to claim 17, wherein said interface surface includes an angled surface oriented at an acute angle of about 1 to about 10 degrees with respect to a perpendicular from said base edge.

19. A door alignment wedge according to claim 18, additionally including an arcuate slot for adjustably positioning said arcuate surface.

20. A door alignment wedge according to claim 19, comprising a high strength plastic material with a lubricant material incorporated therein.

21. A method for simultaneously aligning a door in a top/bottom and a fore/aft orientation in a door jamb as the door is moved into a closed position, the door being mounted for rotation between an open and a closed position about a pivot axis, said method comprising:

providing a first door alignment component having a base edge, an opposite leading edge, an arcuate surface extending between said base edge and said leading edge along a first plane, and an interface surface tapering from said base edge toward said leading edge along a second plane generally perpendicular to said first plane;

providing a second door alignment component having at least one tapered lateral edge;

mounting said first and second door alignment components in proximity to one another generally opposite the pivot axis of the door, one alignment component being mounted on the door and the other alignment component being mounted on the door jamb;

contacting said arcuate surface of said first door alignment component to said angled lateral edge of said second door alignment component along a line of contact to align the door and the door jamb in the top/bottom orientation; and contacting said interface surface of said first alignment component to a corresponding surface of the door or the door jamb to align the door and the door jamb in the fore/aft orientation.

* * * * *